March 29, 1927.  F. J. TILLMAN  1,622,360
MEASURING AND COMPUTING MACHINE
Filed Sept. 14, 1920  2 Sheets-Sheet 1
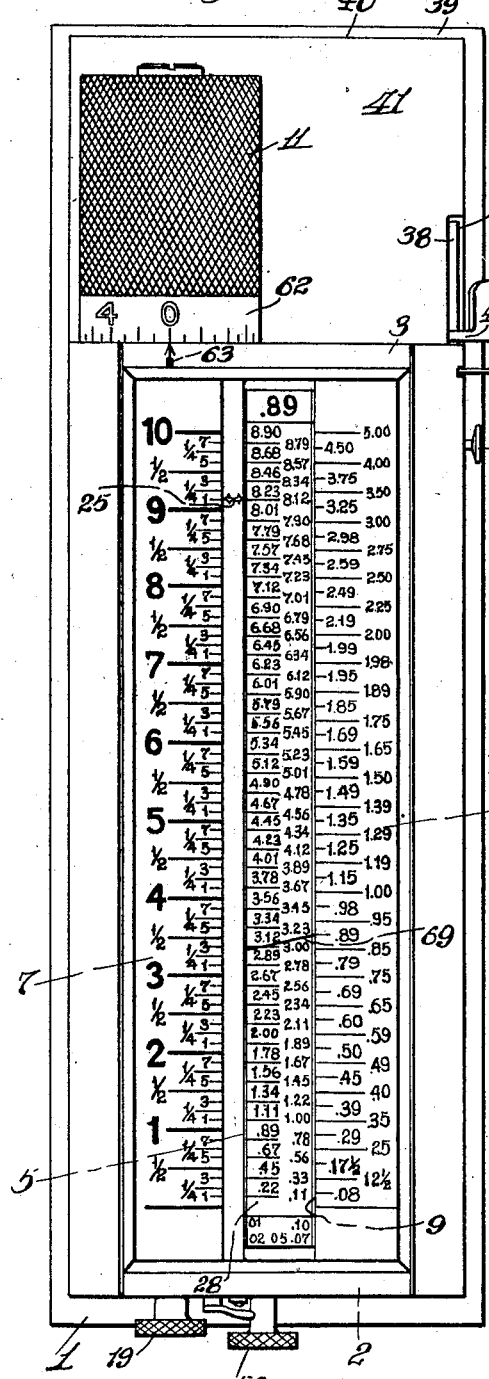
Inventor:
F. J. Tillman.
By A. G. Fletcher
att'y March 29, 1927.  
F. J. TILLMAN  
1,622,360  
MEASURING AND COMPUTING MACHINE  
Filed Sept. 14, 1920   2 Sheets-Sheet 2
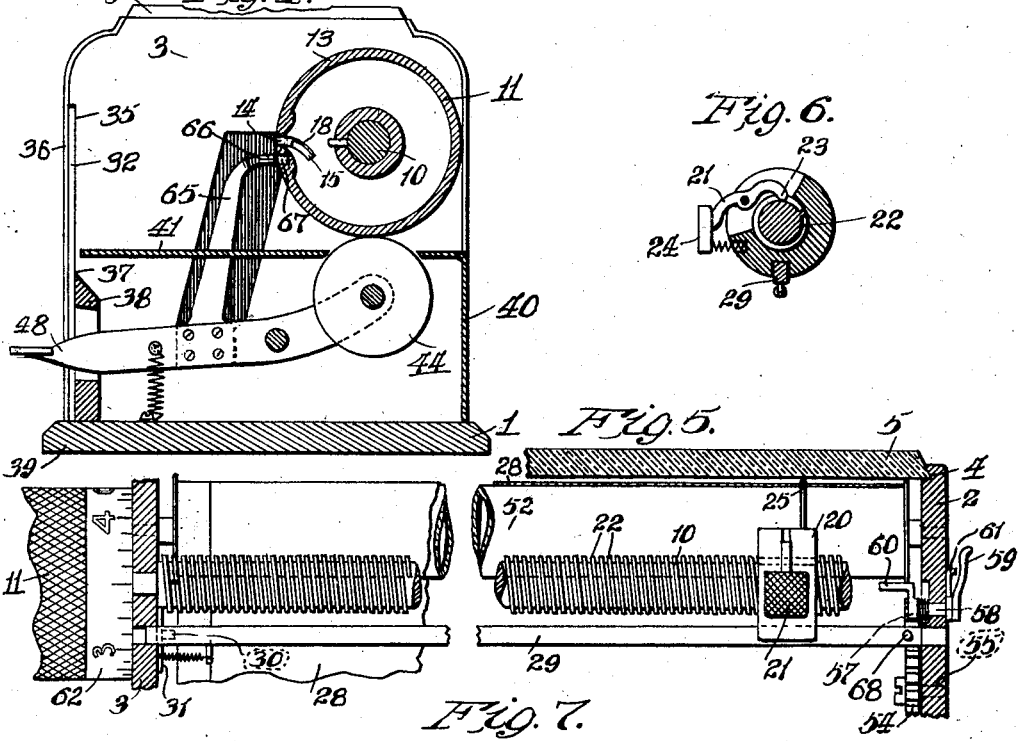
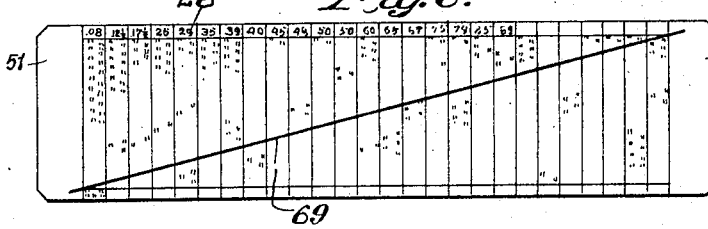
Inventor:  
F. J. Tillman  
By L. G. Fletcher  
atty.

Patented Mar. 29, 1927.

1,622,360

UNITED STATES PATENT OFFICE.

FERDINAND J. TILLMAN, OF ST. LOUIS, MISSOURI, ASSIGNOR TO YARD-O-METER CORPORATION, OF ST. LOUIS, MISSOURI.

MEASURING AND COMPUTING MACHINE.

Application filed September 14, 1920. Serial No. 410,176.

The primary object of this invention is to provide an improved device to be placed on the counters of stores and the like for accurately measuring yardage material as the material is fed through the device as well as providing improved computing or calculating means for automatically indicating the prices of yardage or fractions thereof while the material is being measured, or after it has been measured.

Another object of the invention is to provide a device of this character with improved calculating means which can be rapidly operated relative to finding what the total charge of a desired number of yards of material or fractions thereof will be of any one of a series of various yardage prices.

A further object of the invention is to provide improved means in a device of this character for preventing cutting or marking of the material unless the material has been accurately measured, and other means for preventing the device from being operated after a quantity of material has been measured until the yardage indicating carriage has been returned to a neutral, or zero position, so as to provide accuracy in each succeeding measuring operation.

A still further object of the invention is in providing the feeding roller of the device with improved means so that fine material can be acted on by the roller without straining or stretching and injuring the same.

Another still further object of this invention is to provide the measuring indicating carriage with improved means so that it can be predeterminedly set so as to accurately measure a specified amount of material.

Figure 1 is a plan view of this improved device.

Figure 2 is a sectional plan view of Fig. 1, the intermediate parts thereof being broken away and the chart sheet which is co-operable with the device being removed.

Figure 3 is a cross section taken on the line III—III of Fig. 2.

Figure 4 is a cross section taken approximately on the line IV—IV of Fig. 2.

Figure 5 is a longitudinal section taken approximately on the line V—V of Fig. 2.

Figure 6 is a cross section of the yardage indicating carriage taken on the line VI—VI of Fig. 2.

Figure 7 is a plan view of the price indicating chart or sheet, portions thereof being broken away.

Figure 8 is a diagrammatic view of the price indicating chart, reduced in size.

With reference to the drawings, the base 1 has the end members 2 and 3 extending upwardly therefrom, and formed in each of said members is a groove 4 for the reception of a glass cover plate 5, and formed on the inner face of each of said end members is an opposing ledge 6 to which a horizontally arranged quantity scale 7 is secured, and there being a grade scale 8 parallelling and spaced apart from said scale 7, thereby forming a longitudinal sight opening therebetween, said scales being arranged beneath the glass plate 5.

Extending longitudinally between the end members 2 and 3 is a worm shaft 10 finding bearings in said end members, the end of the shaft extending from the member 3 having a feed roller 11 keyed thereto, the end of said roller adjacent said member 3 being recessed as designated at 12, thereby providing a peripheral wall 13 there being a locking slot 14 formed in said wall for the reception of a projection 15 of a knife operating lever 16 which is pivotally secured at 17 to the inner surface of the end member 3, said projection 15 extending through an opening 18 formed in said member 3.

Secured to the opposite end of the worm shaft 10 adjacent the end member 2 is the hand engaging button 19 for turning the feed roller 11 by hand, and mounted on said shaft between the members 2 and 3 is a yardage indicating carriage 20 bearing a spring actuated releasing member 21, having a portion 23 which is adapted to engage between the threads 22 of said shaft 10, said member 21 bearing a depressing portion 24, and extending upwardly from said carriage is an indicating hand 25 having directing points 26 and 27, the point 26 directing to the quantity scale 7 and the point 27 directing to price figures contained on the indicating chart 28.

Parallelly arranged beneath the shaft 10 and serving as a guiding member to the carriage 20 is a longitudinally movable releasing bar 29 having its ends supported in the end members 2 and 3, the end of said bar adjacent the member 3 bearing a locking projection 30, said bar being spring actuated so that the projection 30 thereof will normally bear against the locking end 31 of the spring actuated knife operating lever 16, so that when said lever is moved downwardly against the knife 32, the projection 30 of said bar will be moved beneath the locking end 31 of said lever 16.

The knife 32 is pivoted at 33 to the portion 34 which extends inwardly from the end member 3, the cutting edge of said knife extending through a slot 35 formed between the end member 3 and the side wall 36, and adapted to co-operate with the cutting edge 37 of the cutting block 38 which is extended in the path of travel of the measured material after it has been passed beneath the feed roller 11.

The base 1 has an extension 39, and mounted on said extension is a housing 40, the upper portion 41 of which provides a table for the reception of the material to be measured, and contained within said housing is a frame 42, one end of which bears a shaft 43 on which is mounted a friction roller 44, said frame being mounted on an axle 45 which is supported at one end in a bracket 46, the opposite end of said axle being supported in the end member 3, said frame 42 being actuated by springs 47, so that the roller 44 carried thereby will normally bear against a portion of the under surface of the feed roller 11, said frame 42 having a portion extending from the housing 40, forming an operating lever 48 which when elevated will disengage the roller 44 from the roller 11.

Longitudinally arranged between the end members 2 and 3 on a plane beneath the worm shaft 10, and supported by shafts 49 are a pair of winding rollers 50, said rollers being co-operable with the price chart 28 in which the ends 51 of said chart are connected respectively to said rollers, said chart being in the form of a sheet one of the surfaces thereof bearing a plurality of price indicating characters, said character bearing surface being adapted to be exposed within the sight opening 9 beneath the glass plate 5 and is guided in such position by the guiding roller 52 which parallels the rollers 50 and is located directly beneath said sight opening.

Secured to one end of each of the shafts 49 is a pinion 53, said pinion being in mesh with an intermediately arranged spur gear 54 which is mounted on an axis 55 supported from the end member 2, and there being a turning member 56 secured to said axis on the outside of said member 2, and for engagement with the teeth of said gear 54 is a locking projection 57 forming part of a locking and releasing member 58 which is spring pressed and reciprocally mounted in the end member 2, and formed on said member 58 is an engaging handle 59, said member 58 also having an extending portion 60 which is arranged in the path of travel of the carriage 20 when said carriage is moved to its neutral position on the shaft 10.

For withholding the projection 57 of the locking member 58 from engagement with the gear 54 when the projection 57 is withdrawn from engagement with said gear, a retaining member 61, which is secured to the end member 2, is swung between the knob 59 and said member 2.

The feed roller 11 is of a diameter wherein the circumference thereof will measure one-eighth of a yard, or four and one-half inches, and in which a measuring band 62 bearing the said four and one-half inch measurements is located on said roller, the cipher thereof designating a neutral position when arranged upwardly as shown in Fig. 1, and registering with the indicating mark 63, and at the commencement of measuring a length of material, it is essential that the carriage 20 be located on the shaft 10 so that the indicating hand 25 thereof will indicate a neutral position on the quantity scale 7.

When it is desired to engage a length of material to be measured beneath the feed roller 11, the lever 48 is engaged and elevated, thereby separating the friction roller 44 from engagement with the roller 11, and the forward portion of the material upon being inserted between said rollers is brought to a position in register with the cutting edge 37 of the cutting block 38, and at which time the lever 48 is released thereby allowing the roller 44 to engage the material against the roller 11. The forward portion of the length of material is then pulled, thereby rotating the feed roller 11 along with the worm shaft 10, and causing the carriage 20 to travel along said shaft towards the feed roller until the indicating finger 25 of said carriage indicates the desired amount of material passed between said rollers 11 and 44, such indication being made by the directing point 26 of said finger on the quantity scale 7 the point 27 of said finger indicating the total cost of the amount of material.

From an inspection of Fig. 1, it is to be noted that the quantity scale 7 is provided with characters designating yardage divisible by eighths of yards, such one-eighth measurements corresponding to the one-eighth of a yard peripheral travel of the feed roller 11. Therefore, when the indicating finger 25 of the carriage 20 has been stopped in measuring alinement with any desired mark or character on the quantity scale 7, as designating yards or fractions of a yard in eighths, the feed roller 11 is also stopped in a position in which the cipher of the measuring band 62 thereof is in register with the indicating mark 63. The knife operating lever 16 is then pressed downwardly, thereby engaging the knife 32 and forcing it downwardly on its pivot 43 so that the cutting edge thereof, upon passing the cutting block 38, will mark or cut the goods or material which will be of the length as designated by the finger 25 of the carriage 20 on the quantity scale 7.

During the downward movement of the knife operating lever 16 the projection 15 thereof was moved into the locking slot 14 formed in the peripheral wall of the roller 11, and as the locking end 31 of the lever was moved upwardly to a position above the projection 30 of the bar 29 which is arranged parallel beneath the worm shaft 10, the projection 30 of said bar 29 will be moved beneath said locking end 31, thereby preventing said lever from being returned to its neutral position and holding the projection 15 of said lever in the locking slot 14 of said roller 11, and as said lever 16 is held against being returned, the knife 32 is also held against returning.

It is to be noted from the aforesaid operation that the locking slot 14 is in a position of alinement with the projection 15 of the lever 16 when the cipher on the feed roller 11 is in alinement with the indicating mark 63, whereas if said cipher were not in register with the mark 63 the projection of said lever 16 would be prevented from operating on the knife 32, thereby preventing the operator from marking an inaccurate measurement on the material, and in which the feed roller will have to be further operated until the cipher thereof is in proper register denoting an accurate measurement corresponding with the carriage indication on the quantity scale 7.

If, however, it is desired to measure a length of material of which the measurement thereof will end in inches, such as one-third of a yard, the inch measurement of the measuring band 62 of the feed roller 11 is taken into consideration and added to the indicating measurage of the finger 25 of the carriage 20 on the quantity scale 7, and in which event the cipher of the measuring band 62 is not taken into consideration relative to registering with the indicating mark 63 and the cutting or marking of the goods by the knife 32 is carried on by engaging the hand operating button 64 and pressing said knife downwardly.

For preventing material being introduced between the feed roller 11 and the friction roller 44 until said feed roller has been properly positioned relative to the cipher thereof registering with the mark 63, an upwardly extending finger 65 bearing an abutting portion 66 is carried by the frame 42 of the friction roller 44, so that if the operating lever 48 of said frame is elevated, the abutting portion of said finger 65 will engage against the periphery of the roller 11, thereby preventing the friction roller 44 from being swung from beneath the feed roller 11. When, however, the cipher of the feed roller 11 is in proper register, the abutting portion 66 of the finger 65 will be in alinement with an opening 67 provided in the periphery of the roller 11 so that said abutting portion can travel into said opening and allow the roller 44 to be moved onwardly for the admission of the material to be measured.

After a length of material has been measured and the marking knife 32 has been operated, in which the roller 11 has been prevented from further operation on account of the locking thereof being affected as described, and the measured goods has not been severed from the bolt and it has been decided to increase the length to be measured, said roller can be released from its locked position by engaging and rearwardly pressing the pin 68 which is carried by the bar 29 thereby releasing the projection 30 of said bar from under engagement with the locking end 31 of the knife operating lever 16, in which the projection 15 of said lever 16 will be moved from engagement with the locking slot 14 of said roller 11.

After the desired amount of goods has been measured, and the roller 11 and knife 32 are in locked position and it is desired to measure another length of material, the releasing member 21 of the carriage 20 is engaged and manipulated, thereby disengaging the portion 23 thereof from the threads 22 of the shaft 10 so that said carriage can be moved ineffectively along said shaft to its neutral position adjacent the end member 2, and upon engagement of said carriage with the pin 68 of the releasing bar 29, said bar will be moved rearwardly, thereby releasing the operating lever 16 in which the roller 11 and knife 32 will be unlocked, thereby leaving the device ready for the next measuring operation.

The aforesaid construction relates more particularly to the mechanisms pertaining to the measuring operation of the device, the calculation of the material measured or to be measured being carried out by the co-operation of the parts referred to as the grade scale 8, quantity scale 7 and price chart sheet 28.

In order to bring out more clearly the advantages and adaptation of a combination of calculating elements of this character that are readable relative to one another, the grade scale 8 is provided with a plurality of different yardage prices denoting different grades of materials, whereas the quantity scale 7 is provided with yardage characters measuring in eighths of yards up to ten yards, and the price chart sheet 28 is provided with a plurality of different prices corresponding with the eighth yardage measurements of the quantity scale 7 and there being a diagonal line 69 extending from the lower left corner of the sheet to the upper right corner thereof.

The price characters of said chart sheet are in travelling alinement with the quantity scale 7 as said sheet is passed through the sight opening 9 when the rollers 50 bearing said sheet are actuated by the gear 54.

The characters of the chart sheet are arranged in double column formation, each set of double columns relating to a specific grade or yardage price, and are arranged so as to be readable transversely of the sheet, the row of figures to the left of each double column being in corresponding alinement with the one quarter yard measurements of the quantity scale 7, whereas the row of figures to the right of each double column are in corresponding alinement with the one-eighth yard measurements of said quantity scale 7, said chart sheet containing a number of double columns equal to the number of grade or price characters of the grade scale 8, and in which the diagonal line 69 of said sheet is so arranged on said sheet as to be co-operably arranged through and with each of the double columns so that the top of said line 69 as seen through the sight opening 9 when directed to a certain grade or price character on the grade scale 8, the double column set seen through the sight opening will designate the specific prices for calculation on any amount of material from one-eighth of a yard to ten yards in accordance with the elected price or grade indicated by the diagonal line of the chart sheet on the grade scale 8.

In view of the aforesaid and in the measuring operation and selecting a grade of material to be calculated and measured, the turning member 56 is engaged and turned so as to operate the chart sheet 28, and as the said sheet is caused to traverse the sight opening 9 the operator follows the travel of the right upper end of the diagonal line 69 until said diagonal line is in alinement with the grade of material desired on the grade scale 8, and from a glance at the quantity scale 7 any desired amount of goods to be measured up to ten yards can be calculated from said scale 7 by longitudinally alining the desired amount on said scale 7 with the desired row of figures of the double column which has been set within the sight opening 9. For instance, as shown within the sight opening in Fig. 1, the diagonal line is in a position of indication with —89—, meaning eighty nine cents per yard grade on the grade scale 8. Therefore, the double column disclosed in the sight opening 9 pertains to yardage prices at eighty nine cents per yard ranging from one-eighth of a yard to ten yards, and if nine yards is the desired amount of goods or material to be calculated, the total charge of the character —9— on the quantity scale 7 is indicated at $8.01 on the sheet and in the left row of the column disclosed in the sight opening. On the other hand if nine and one-eighths yards is to be calculated, $8.12 will be the total charge which is the alining figure in the right row of the column disclosed in the sight opening.

After the afore referred to calculation has been carried out, the measuring operation is then carried on, the operator taking care of course to stop the feeding of the material through the rollers 11 and 44 when the finger 25 of the indicating carriage 20 has reached the desired quantity mark on the quantity scale 7 as previously elected by the customer commensurate with the total cost of nine or nine and one eighths yards already given. From the aforesaid it is readily seen that the chart sheet can be quickly operated for finding and giving the total charges of any amount and grade of goods to a customer without operating the measuring mechanism. And for holding the chart sheet in a locked position against the chart sheet being disturbed by another operator the locking member 58 is operated thereby allowing the locking projection 57 to enter between teeth of the gear 54, said member 58 being allowed to move inwardly by releasing the retaining member 61 from engagement with the operating knob 59.

If the locking member 58 has been left in a locking position relative to the gear 54 during the measuring operation, the carriage 20 upon being returned to a neutral position will engage the extending portion 60 of said member 58, thereby disengaging the projection 57 from the gear 54.

In the measuring of fine material, which does not have enough body to it to withstand the pulling strain thereof between the rollers 11 and 44, such fine material is inserted between said rollers in the opposite direction, in which the inserting edge thereof will be to the left hand of the operator and engaged or alined with the left side of the housing or table 40. The depressing portion 24 of the carriage 20 is engaged so that said carriage is released on the worm shaft and moved on said shaft to a position in which the indicating hand 25 of said carriage will indicate the amount of goods desired on the quantity scale 7, and the operating button 19 of the worm shaft 10 is turned by the operator in a right hand direction, thereby feeding the fine material between the rollers 11 and 44, the operator continuing the turning of the button 19 until the carriage has been moved to the end of its travel on said shaft to a neutral position of registration with the scale 7, thereby stopping said shaft from further turning and indicating to the operator that the desired predetermined amount of material has been fed between the rollers.

What I claim and desire to secure by Letters Patent, is:—

1. In a measuring machine, a worm shaft bearing a carriage, a measuring scale co-operable with said carriage, a pair of friction rollers one of which operates said shaft, releasing means provided on said carriage whereby said carriage can be moved on said shaft without said shaft being operated, severing means for operating on the measured material, operating means for said severing means, and means provided on one of said rollers for preventing said operating means actuating said severing means except when the said roller is in a definite position relative to said operating means.

2. In a measuring device, the combination of a quantity indicating scale, a grade scale arranged parallel to said quantity scale, an indicating element related to both of said scales and movable therebetween, a worm shaft paralleling said scales, a pointer under the control of said shaft adapted to simultaneous indication on said quantity scale and said element, a measuring roller mounted on said shaft, severing means, means for actuating said severing means, actuating means for operating on said severing means when said roller is in a definite position relative to said operating means.

3. In a measuring machine, a worm shaft bearing a carriage, a measuring scale co-operable with said carriage, a pair of friction rollers one of which operates said shaft, severing means, operating means for said severing means, said operating means bearing means for locking co-operation with one of said rollers when the latter is in a definite position relative to said locking means, and locking means for said operating means effective on said operating means after said operating means has actuated said severing means, said carriage when moved to a neutral position on said shaft adapted to release said last mentioned locking means.

4. In a measuring machine, the combination of a worm shaft, a material feed roller for operating said shaft, a friction roller co-operable with said feed roller, a quantity indicating scale, an indicating carriage movable along said scale by said shaft, severing means for operating on the material after it has passed between said rollers, and locking means for operating said severing means and co-operable with said feed roller for preventing said feed roller from being further operated after said severing means has been operated.

5. In a measuring machine, a worm shaft bearing a carriage, a measuring scale co-operable with said carriage, a pair of friction rollers one of which operates said shaft, severing means for operating on the material after being passed between said rollers, and locking means for operating said severing means and co-operable with one of said rollers for preventing said rollers from being further operated after said severing means has operated.

6. In a measuring machine, a worm shaft bearing a carriage, a measuring scale co-operable with said carriage, a pair of friction rollers one of which operates said shaft, severing means for operating on the material after being passed between said rollers, and operating means for said severing means to be operated only when one of said rollers is in a predetermined position relative to said operating means, and means provided whereby said operating means is prevented from actuating said severing means except when said roller is in the predetermined position.

7. In a measuring machine, a worm shaft bearing a carriage, a scale co-operable with said carriage, a measuring roller for operating said shaft, severing means for operating on the material after it has been measured by said roller, operating means for said severing means having a portion for engagement with said roller, for preventing said operating means for actuating said severing means, said roller having a recessed part for co-operation with said portion of said operating means for allowing said operating means to actuate.

8. In a measuring machine, the combination of a feed roller for co-operation with the material to be measured, a quantity scale, an indicating carriage operated by said roller and movable along said scale, and a scale carried by said roller, said scale bearing characters which are comparative with said quantity scale.

9. In a measuring machine, the combination of a feed roller having a circumference equal to one-eighth of a yard and bearing graduations, a worm shaft to be revolved by said roller, a quantity indicating scale bearing one-eighth yard graduations, and an indicating carriage movable along and by said shaft and adapted to travel the approximate length of said scale and indicate correspondingly with the graduations of said roller.

10. In a measuring machine, a worm shaft bearing a carriage, a scale with which said carriage is co-operable as said carriage is travelled therealong, a measuring roller for operating said shaft, severing means for operating on the material after being measured, locking means for locking said roller simultaneously with the operating of said severing means, and means for holding said locking means in locked position adapted to be released by said carriage.

11. In a measuring machine, the combination of a worm shaft bearing a carriage, a measuring scale with which said carriage is co-operable as said carriage is travelled therealong, a material feed roller for operating said shaft, a knife for marking the material, a lever for operating said knife bearing means for locking co-operation with said roller when the latter is in a definite position relative thereto, said lever when operated being adapted to actuate said knife and simultaneously lock said roller, and means for automatically locking said lever after said lever has operated said knife.

12. In a measuring machine, a pair of contacting material feed rollers between which the material to be measured is to be passed, and a movable supporting frame for one of said rollers for disengaging one of said rollers from said other roller, and means borne by said frame for preventing said rollers being co-operably separated except when one of said rollers is in a definite position relative to said means.

13. In a measuring machine, a pair of material feed rollers between which the material to be measured is to be passed, and a movable supporting frame for one of said rollers bearing a portion which is adapted to abut the periphery of the other said roller for preventing said rollers from becoming co-operably separated, the last named roller bearing a recess for the reception of said portion of said frame so that said roller can become co-operably separated when the roller having the recess is in a definite position relative to said abutting portion.

14. In a measuring machine, the combination of a worm shaft, a material feed roller for operating said shaft, a friction roller co-operable with said feed roller, a quantity indicating scale, an indicating carriage movable by and along said shaft and said scale, a knife for operating on the material after it has passed between said rollers, means co-operable with said knife and said feed roller for operating said knife and preventing said roller from further operation, and means preventing said friction roller from being moved from co-operation with said feed roller operable when the latter is in a definite position relative to said last mentioned means.

15. In a measuring machine, the combination of a worm shaft bearing a carriage, a measuring scale co-operable with said carriage, a material feed roller for operating said shaft, a knife for marking the material, a lever for operating said knife bearing means for locking co-operation with said roller operable when the latter is in a definite position relative to said means, said lever when operated adapted to actuate said knife and simultaneously lock said roller, means for automatically locking said lever after said lever has operated said knife, releasing means borne by said carriage whereby said carriage can be moved on said shaft without the operation of said roller thereon, so that said carriage can be moved to a position of zero indication on said scale, and means forming part of said automatic locking means of said lever arranged within the path of travel of said carriage for releasing said automatic locking means.

16. In a measuring machine, the combination of a worm shaft, a material feed roller for operating said shaft, a friction roller co-operable with said feed roller, an indicating scale, an indicating carriage movable by and along said shaft and said scale, a knife for operating on the material after it has passed between said rollers, and means for operating said knife co-operable with said feed roller for preventing said roller from further operation.

FERDINAND J. TILLMAN.